Figure 1:
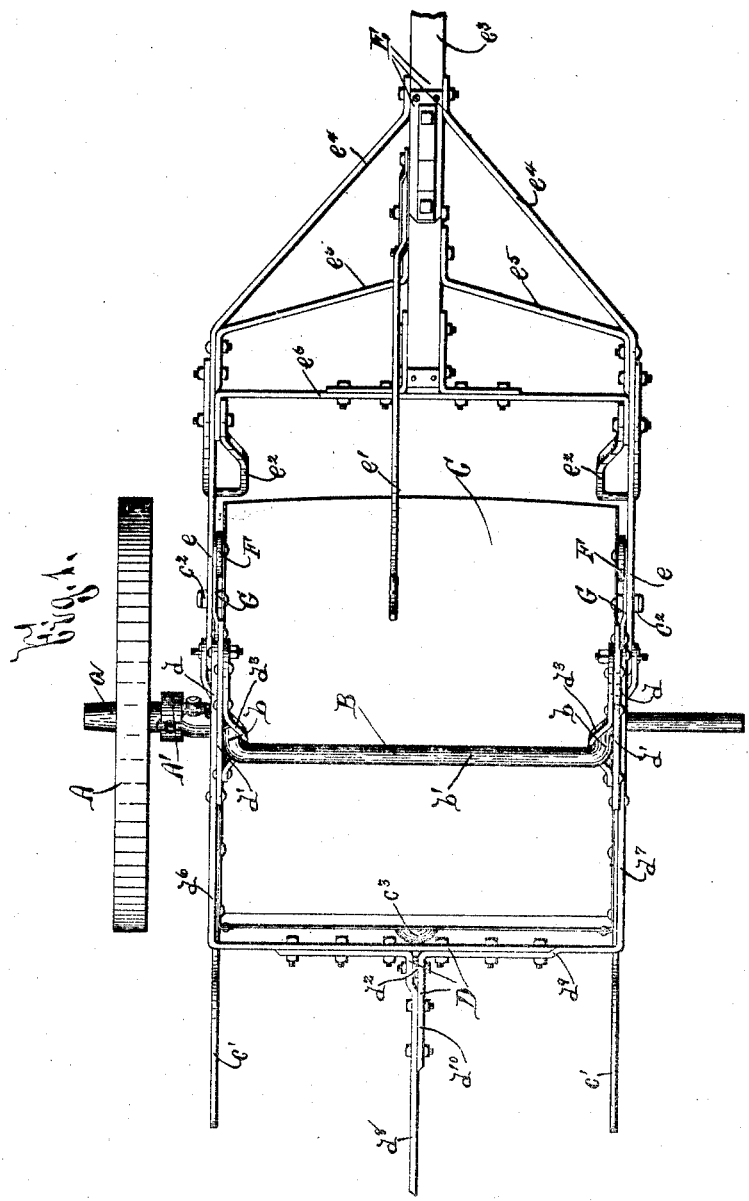

No. 776,165. PATENTED NOV. 29, 1904.
H. N. & G. N. BAKER.
WHEELED SCRAPER.
APPLICATION FILED JAN. 28, 1901.
NO MODEL. 5 SHEETS—SHEET 1.

WITNESSES:
C. J. Foner.
W. F. Brewer.

INVENTORS
Herbert N. Baker,
George N. Baker.
BY
Hey & Parsons.
ATTORNEYS.

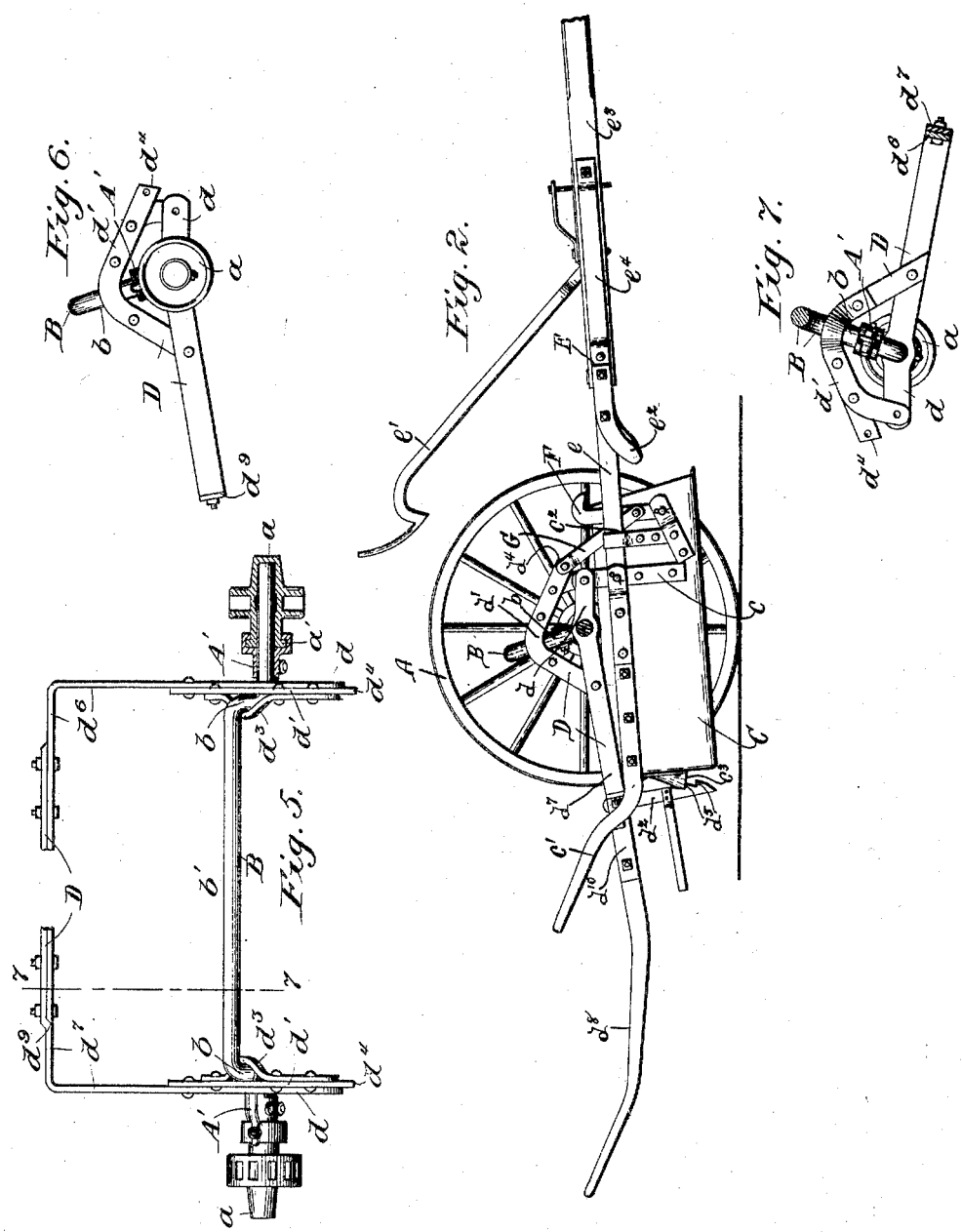

No. 776,165. PATENTED NOV. 29, 1904.
H. N. & G. N. BAKER.
WHEELED SCRAPER.
APPLICATION FILED JAN. 28, 1901.
NO MODEL. 5 SHEETS—SHEET 3.
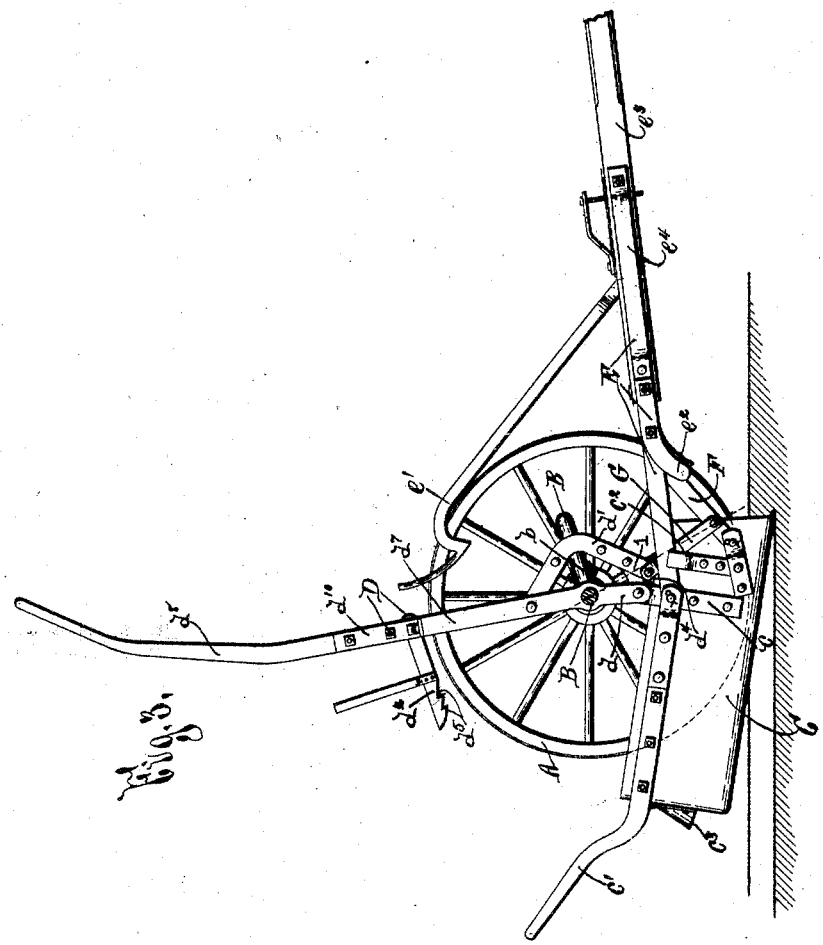
WITNESSES:
E. J. Jones.
W. T. Brewer.
INVENTORS
Herbert N. Baker.
George N. Baker.
BY
Hey + Parsons.
ATTORNEYS.

No. 776,165. PATENTED NOV. 29, 1904.
H. N. & G. N. BAKER.
WHEELED SCRAPER.
APPLICATION FILED JAN. 28, 1901.
NO MODEL. 5 SHEETS—SHEET 4.
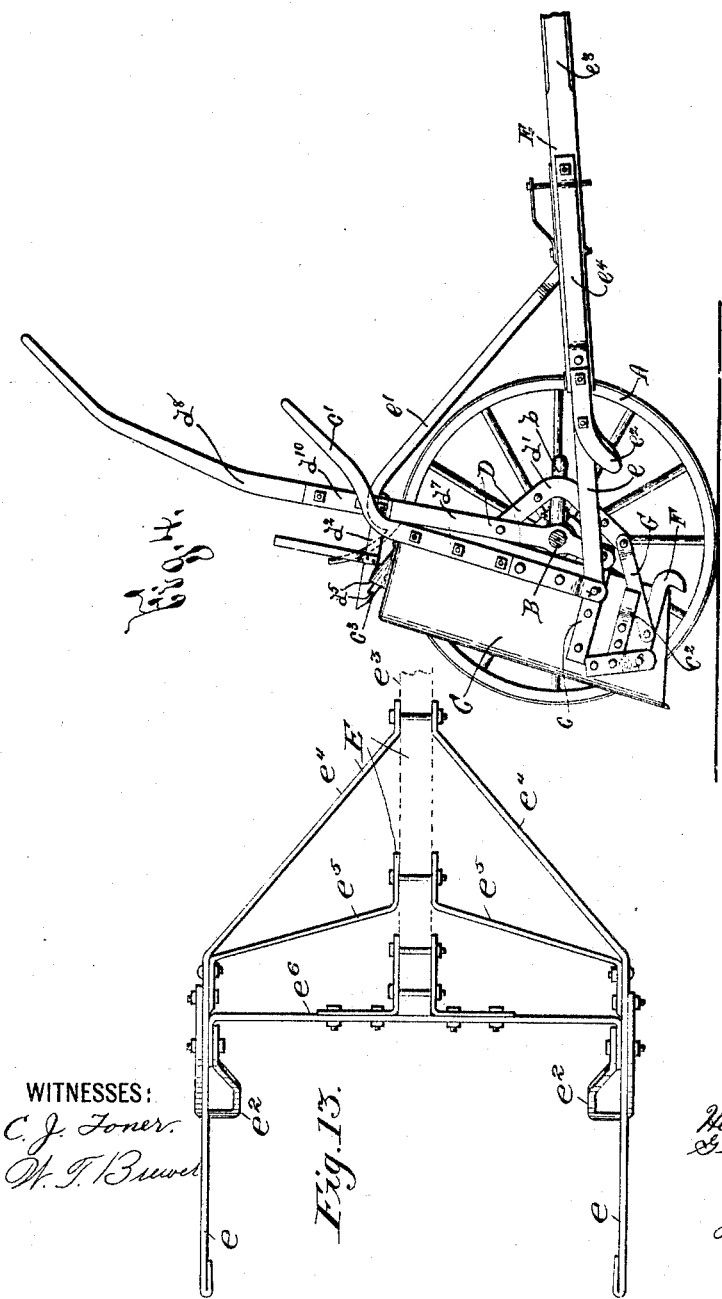
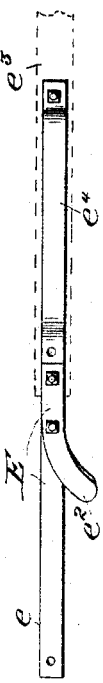
WITNESSES:
C. J. Foner.
W. T. Brewer.
INVENTORS
Herbert N. Baker.
George N. Baker.
BY
Hey + Parsons.
ATTORNEYS.

No. 776,165. PATENTED NOV. 29, 1904.
H. N. & G. N. BAKER.
WHEELED SCRAPER.
APPLICATION FILED JAN. 28, 1901.
NO MODEL. 5 SHEETS—SHEET 5.
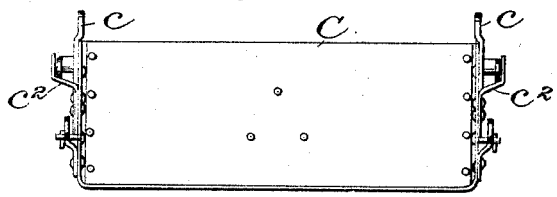
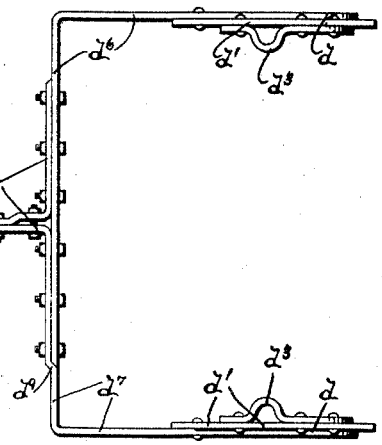
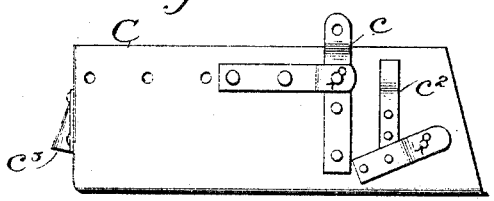
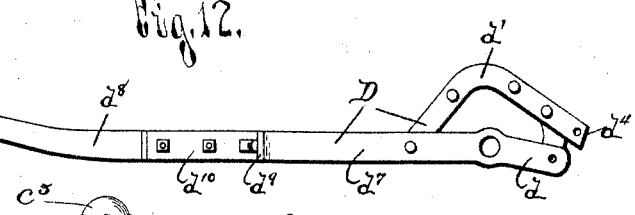
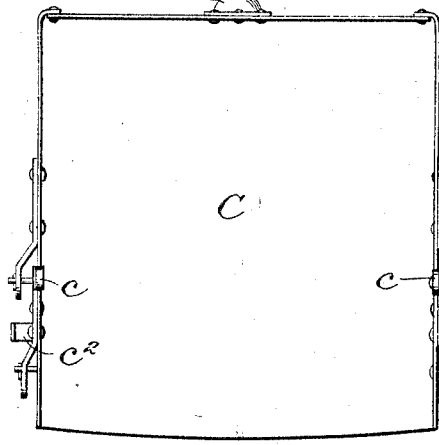

No. 776,165. Patented November 29, 1904.

UNITED STATES PATENT OFFICE.

HERBERT N. BAKER AND GEORGE N. BAKER, OF SYRACUSE, NEW YORK, ASSIGNORS TO SYRACUSE CHILLED PLOW COMPANY, OF SYRACUSE, NEW YORK, A CORPORATION OF NEW YORK.

WHEELED SCRAPER.

SPECIFICATION forming part of Letters Patent No. 776,165, dated November 29, 1904.

Application filed January 28, 1901. Serial No. 45,037. (No model.)

*To all whom it may concern:*

Be it known that we, HERBERT N. BAKER and GEORGE N. BAKER, of Syracuse, in the county of Onondaga and State of New York, have invented certain new and useful Wheeled Scrapers, of which the following is a specification.

Our invention has for its object the production of a wheeled scraper which is strong and durable and requires but a minimum exertion on the part of the operator when the tray is being filled and while the same is being raised out of the ground; and to this end it consists in certain novel combinations and devices as hereinafter fully described, and pointed out in the claims.

Figures 1 and 2 are respectively top plan and side elevation, partly broken away, of our scraper. Figs. 3 and 4 are additional side elevations, partly broken away and in section, of said scraper, the tray being shown in Fig. 3 as receiving its load and in Fig. 4 as having discharged said load. Fig. 5 is a top plan view, partly broken away and in section, of the detached axle, the wheel-hubs, and the front end of the lever. Fig. 6 is a side elevation of the parts seen in Fig. 5. Fig. 7 is a sectional view taken on line 7 7, Fig. 5. Figs. 8, 9, and 10 are respectively top plan, front elevation, and side elevation of the detached tray. Figs. 11 and 12 are respectively top plan and side elevation of the detached lever. Figs. 13 and 14 are respectively top plan and side elevation of the detached rear end of the draft member, a portion thereof being indicated by dotted lines.

Our scraper consists, essentially, of supporting-wheels A, an axle B, a tray C, a lever D, a draft member E, means for causing the forward movement of the draft member to raise the tray out of the ground, and means for preventing the draft member from raising the tray out of the ground during the filling of said tray.

The supporting-wheels A are of any desirable form, size, and construction, being here shown as formed with hubs $a$, having their inner ends provided with annular shoulders $a'$. The hubs $a$ are prevented from endwise movement by connecting members $A'$ and are provided with internal chambers which receive the ends of the axle B and are formed with closed outer ends. Said axle B supports the connecting members $A'$, previously mentioned, and connects the wheels A, which are generally loosely mounted thereon. As best seen in Figs. 1 and 5, the axle B is provided with cranks $b$, arranged at the inner sides of the wheels A and connected by an intermediate portion $b'$ of the axle.

The tray C is formed with bottom, side, and rear walls, is open at its front end and its top, and is provided with connecting-pieces $c$, handles $c'$, and shoulders $c^2$ $c^3$. Said connecting-pieces $c$ are arranged in substantially upright planes, are fixed to the outer face of the front part of the tray C, and extend upwardly above the contiguous portions of the upper edge of the tray. The portions of the connecting-pieces $c$ extending above the upper edge of the tray thus form, essentially, upwardly-projecting arms for the tray. The handles $c'$ are of any desirable form, size, and construction. The shoulders $c^2$ project laterally from opposite sides of the tray C in advance of the connecting-pieces $c$, and the shoulder $c^3$ is formed with a substantially horizontal lower face and a top face inclined forwardly from the outer edge of said lower face.

As best shown in Fig. 2, the lever D is supported on the axle B with its axis substantially coincident with the axis of the axle B, extends forwardly and rearwardly from said axle, and forms means for forcing the supplemental draft members F and the links G, previously described, from their operative position. The portion of the lever D in front of the axle B is extended downwardly toward its front end, supports the tray C, and consists of opposite arms $d$, pivoted at their extremities to the upper ends of the connecting-pieces $c$ above the upper edge of the tray. Said lever D is preferably provided with upwardly-extending arms $d'$ and a depending arm $d^2$. The inner faces of the arms $d'$ are formed with eyes $d^3$ for receiving the cranks $b$ of the axle B, and the front ends of said arms $d'$ are provided with shoulders $d^4$ for engaging the upper edge of the tray and the front edges of the connecting-pieces $c$ in advance of the pivotal point of the tray and the lever D and limiting the forward movement of the rear end of the lever D. The depending arm $d^2$ is suitably pivoted to the contiguous portion of the lever D and is provided with a plurality of shoulders $d^5$, arranged one above the other and adapted to engage the lower face of the shoulder $c^3$ upon the tray C.

As preferably constructed the lever D consists of a plurality of sections $d^6$ $d^7$ $d^8$, each having branches arranged at substantially right angles with each other. Corresponding branches of the sections $d^6$ $d^7$ extend forwardly substantially parallel with the line of draft, and their outer ends form the portions or arms $d$ of the lever D extending in front of the axle B. The other branches of said sections $d^6$ $d^7$ are lapped upon each other, one of said other branches being formed with a laterally-extending part $d^9$, engaged with the end edge of the other of said branches and with a second part, $d^{10}$, extending rearwardly in a plane substantially parallel with the line of draft and midway between the planes of the forwardly-extending branches of the sections $d^6$ $d^7$. One branch of the section $d^8$ is lapped upon the part $d^{10}$ of the section $d^7$, and the other branch of said section $d^8$ is lapped upon the adjacent or rear branch of the section $d^6$.

The draft member E, which is pivoted to the tray C at a point in advance of the axle B and beneath the pivotal point of the tray C and the lever D in proximity to the upper edge of the tray, is usually provided with opposite arms $e$, having their rear ends pivoted to the connecting-pieces $c$ by pivotal pins fixed relatively to the tray and their intermediate portions movable into engagement with the shoulders $c^2$ for limiting the downward movement of the draft member E independently of the tray. As preferably constructed the draft member E is provided with an upwardly-extending stop-arm $e'$ for preventing the rearward or return movement of the rear end of the tray after the discharge thereof and with loops $e^2$ projecting from the inner sides of the front ends of the arms $e$. Said draft member E consists of a central longitudinal section $e^3$, front sections $e^4$, arranged on opposite sides of the section $e^3$ and formed with front portions lapped upon opposite sides of the central section $e^3$, intermediate portions extending rearwardly from the central section $e^3$, and rear portions extending rearwardly beyond the rear end of the central section $e^3$ in planes substantially parallel therewith and forming the opposite arms $e$, intermediate sections $e^5$, formed with front portions lapped upon opposite sides of the central section $e^3$ at the rear of the corresponding portions of the front sections $e^4$, intermediate portions extending laterally from said section $e^3$, and rear portions lapped upon the inner faces of the rear portions of the front sections $e^4$, and a rear section $e^6$, having its central part provided with surfaces engaged with the end and sides of the rear end of the section $e^3$ and having rearward extensions lapped upon the inner faces of the rear portions of the sections $e^4$.

The means for causing the forward movement of the draft member E to raise the tray C out of the ground consists of the means previously described for connecting said tray to the axle B and to said draft member.

The means for preventing the draft member E from raising the tray out of the ground during the filling of said tray consists of supplemental draft members F and links G. Said supplemental draft members F, which form additional means for connecting the tray C and the draft member E, are here illustrated when in operative position, Fig. 3, as having their rear ends pivoted to the tray C beneath and in advance of the pivotal point of said tray and the draft member E, as inclined upwardly and forwardly, and as having their front ends detachably engaged with the loops $e^2$ upon the draft member E. The links G are shown as having their front or lower ends pivoted to the supplemental draft members F above and in advance of their pivots, as inclined upwardly and rearwardly, and as having their rear or upper ends secured to the lever D by pivotal pins arranged at the rear of a line, as 1, Fig. 3, drawn through the axis of the axle B and the pivotal point of the links G and the supplemental draft members F when the links G are in their operative position. Rearward movement of the rear or upper ends of the links G is prevented by the shoulders $d^4$, which limit the forward movement of the rear end of the lever D, as previously described.

In the use of our wheeled scraper the operator disengages the arm $d^2$ from the shoulder $c^3$, whereupon the tray falls to the ground and the lever D swings on the axle B until its shoulders $d^4$ engage the upper edge of the tray and the front edges of the connecting-pieces $c$. As the draft member E is moved forwardly the front end of the tray enters the ground and said tray is filled. During the filling of the tray the draft member E is connected thereto by the pivotal pins for said draft member and by the supplemental draft members F. The means connecting said tray to the axle and pivoting the tray to the draft member tends during the filling of the tray to raise said tray out of the ground and force the rear end of the lever D downwardly and rearwardly; but at the same time the supplemental draft members F and the links G transmit to the lever D at the rear of the axis of the axle B strain which tends to force the rear end of the lever D forwardly and upwardly, and thus counteracts the operation of said means, tending to raise the tray out of the ground. When the tray is filled, the operator pulls the rear or free end of the lever D rearwardly and downwardly, thus forcing the pivotal point of the links G and the lever D in front of a line, as 1, drawn through the axis of the axle B and the pivotal point of the links G and the supplemental draft members F, whereupon the supplemental draft members F and the links G are out of their operative position. As the free end of the lever is moved rearwardly and downwardly the tray is readily raised, this action being greatly facilitated, especially during the movement of the front end of the tray out of the ground, by the means connecting the tray to the axle B and pivoting the tray to the draft member E. The filled tray is held in its elevated position by the engagement of the shoulders $d^5$ of the arm $d^2$ with the shoulder $c^3$, and should the operator be unable to readily raise the tray with a single effort to the limit of its upward movement he may engage the lowermost shoulder of the arm $d^2$ with the shoulder $c^3$ and then rest himself momentarily before additionally raising said tray. When the place of dumping is reached, the tray is discharged in the usual manner by moving the free end of the lever upwardly and forwardly and by moving the draft member E forwardly. The discharged tray is then held by the stop-arm $e'$ in its position assumed during the discharge thereof.

The construction and operation of our wheeled scraper will now be readily understood upon reference to the foregoing description and the accompanying drawings, and it will be evident that considerable change may be made in the relative construction and arrangement of the component parts of said scraper without departing from the spirit of our invention.

Having thus fully described our invention, what we claim as new, and desire to secure by Letters Patent, is—

1. In a wheeled scraper, the combination of supporting-wheels, an axle connecting the wheels, a tray, a draft member, means coöperating with the tray and the draft member for causing the forward movement of the draft member to raise the tray out of the ground, and means coöperating with the tray and the draft member for preventing the draft member from raising the tray out of the ground during the filling of said tray, substantially as and for the purpose described.

2. In a wheeled scraper, the combination of supporting-wheels, an axle connecting the wheels, a lever supported on the axle, a tray supported by the lever, a draft member, means for causing the forward movement of the draft member to move the rear end of the lever rearwardly and raise the tray, means for transmitting strain to the lever during the forward movement of the draft member tending to move the rear end of the lever forwardly and prevent raising of the tray, and means for limiting the forward movement of the rear end of the lever during the forward movement of the draft member, substantially as and for the purpose specified.

3. In a wheeled scraper, the combination of supporting-wheels, an axle connecting the wheels, a lever supported on the axle, a tray supported by the lever, a draft member, means for causing the forward movement of the draft member to move the rear end of the lever rearwardly and raise the tray, means connecting the tray and draft member, and a link having one end pivoted to said means connecting the tray and the draft member, and its other end secured to the lever by a pivotal pin arranged at the rear of a line drawn through the axis of the axle and the pivotal pin of said means and the link when said link is in its operative position for transmitting strain to the lever during the forward movement of the draft member tending to move the rear end of the lever forwardly and prevent raising of the tray, and means for limiting the forward movement of the rear end of the lever during the forward movement of the draft member, substantially as and for the purpose specified.

4. In a wheeled scraper, the combination of supporting-wheels, an axle connecting the wheels, a lever supported on the axle, a tray supported by the lever and provided with means coöperating with the lever for limiting the forward movement of the rear end of the lever, a draft member, means for causing the forward movement of the draft member to move the rear end of the lever backwardly and raise the tray, and means for transmitting strain to the lever during the forward movement of the draft member tending to move the rear end of the lever forwardly and prevent raising of the tray, substantially as and for the purpose described.

5. In a wheeled scraper, the combination of supporting-wheels, an axle connecting the wheels, a tray, a lever supported on the axle and connected to the tray, said lever being provided with means for engaging the tray and limiting the forward movement of the rear end of the lever, a draft member, means for causing the forward movement of the draft member to move the rear end of the lever backwardly and raise the tray, and means for transmitting strain to the lever during the forward movement of the draft member tending to move the rear end of the lever forwardly and prevent raising of the tray, substantially as and for the purpose specified.

6. In a wheeled scraper, the combination of supporting-wheels, an axle connecting the wheels, a tray, a lever mounted on the axle and extending forwardly and rearwardly therefrom, said lever having its portion extending in front of the axle pivoted to the tray for supporting said tray and provided with a shoulder for limiting the forward movement of the rear end of the lever, and a draft member pivoted to the tray at a point in advance of the axle and beneath the pivotal point of the tray and the lever, substantially as and for the purpose described.

7. In a wheeled scraper, the combination of supporting-wheels, an axle connecting the wheels, a tray, a lever mounted on the axle and having opposite arms extending forwardly and rearwardly therefrom, the portions of said arms extending in front of the axle being pivoted to the tray and provided with shoulders movable into engagement with the upper edge of the tray for limiting the forward movement of the rear end of the lever, and a draft member having opposite arms pivoted to the tray at a point in advance of the axle and beneath the pivotal point of the tray and the lever, substantially as and for the purpose set forth.

8. In a wheeled scraper, the combination of supporting-wheels, an axle connecting the wheels, a tray, a connecting-piece fixed to the outer face of the tray and arranged in a substantially upright plane, a lever mounted on the axle and extending forwardly and rearwardly therefrom, said lever having its portion extending in front of the axle pivoted to the connecting-piece for supporting said tray and provided with a shoulder movable into engagement with the tray in advance of the connecting-piece for limiting the forward movement of the rear end of the lever, and a draft member having opposite arms pivoted to the tray at a point in advance of the axle and beneath the pivotal point of the tray and the lever, substantially as and for the purpose described.

9. In a wheeled scraper, the combination of supporting-wheels, an axle connecting the wheels, a tray, a lever mounted on the axle and extending forwardly and rearwardly therefrom, said lever having its portion extending in front of the axle pivoted to the tray for supporting said tray and provided with a shoulder for limiting the forward movement of the rear end of the lever, a draft member pivoted to the tray at a point in advance of the axle and beneath the pivotal point of the tray and the lever whereby the forward movement of the draft member raises the tray, and means connecting the lever and the draft member for normally preventing the draft member from raising the tray, substantially as and for the purpose specified.

10. In a wheeled scraper, the combination of supporting-wheels, an axle connecting the wheels, a tray, a lever mounted on the axle and having opposite arms extending forwardly and rearwardly therefrom, the portions of said arms extending in front of the axle being pivoted to the tray and provided with shoulders movable into engagement with the upper edge of the tray for limiting the forward movement of the rear end of the lever, a draft member pivoted to the tray at a point in advance of the axle and beneath the pivotal point of the tray and the lever whereby the forward movement of the draft member raises the tray, and means connecting the lever and the draft member for normally preventing the draft member from raising the tray, said means being movable from its operative position as the rear end of the lever is moved rearwardly, substantially as and for the purpose set forth.

11. In a wheeled scraper, the combination of supporting-wheels, an axle connecting the wheels, a tray, a lever mounted on the axle and extending forwardly and rearwardly therefrom, said lever having its portion extending in front of the axle pivoted to the tray for supporting said tray and provided with a shoulder for limiting the forward movement of the rear end of the lever, a draft member pivoted to the tray at a point in advance of the axle and beneath the pivotal point of the tray and the lever whereby the forward movement of the draft member raises the tray from its operative position, means secured to the tray beneath the pivotal point of the tray and the draft member and connected to said draft member, and a link having one end pivoted to said means and its other end pivoted to the lever at the rear of a line drawn through the axis of the axle and the pivotal point of said means and the link when said link is in its operative position, substantially as and for the purpose described.

12. In a wheeled scraper, the combination of supporting-wheels, an axle connecting the wheels, a tray, a lever mounted on the axle and extending forwardly and rearwardly therefrom, said lever having its portion extending in front of the axle pivoted to the tray for supporting said tray and provided with a shoulder movable into engagement with the tray in front of the pivotal point of the tray and the lever for limiting the forward movement of the rear end of the lever, a draft member pivoted to the tray at a point in advance of the axle and beneath the pivotal point of the tray and the lever, a supplemental draft member pivoted to the tray beneath and in front of the pivotal point of the tray and the lever, said supplemental draft member being detachably engaged with the former draft member and inclined upwardly and forwardly from the tray when in its operative position, and a rearwardly-inclined link having its lower end pivoted to the supplemental draft member and its upper end secured to the lever by a pivotal pin arranged in front of the pivotal point of the tray and the lever and at the rear of a line drawn through the axis of the axle and the pivotal point of the supplemental draft member and the link when said link is in its operative position, substantially as and for the purpose described.

13. The herein-described lever for a wheeled scraper, the same comprising a plurality of sections, each section having branches arranged at substantially right angles with each other, two of said sections having corresponding branches extended forwardly substantially parallel with the line of draft, and their other branches lapped upon each other, one of said other branches being formed with a laterally-extending part engaged with the end edge of the other of said branches and with a second part extending rearwardly in a plane arranged substantially parallel with the line of draft and midway between the planes of said forwardly-extending branches, and a third section having one branch lapped upon said second part of one of said two sections and its other branch lapped upon the adjacent or rear branch of the other of said two sections, substantially as and for the purpose described.

14. The herein-described draft member for a wheeled scraper, the same comprising a central longitudinal section, front sections arranged on opposite sides of the central section and formed with front portions lapped upon opposite sides of the central section, intermediate portions inclining rearwardly from the front portions, and rear portions extending rearwardly beyond the rear end of the central section in planes substantially parallel therewith, intermediate sections formed with front portions lapped upon opposite sides of the central section, intermediate portions extending laterally from the central section, and rear portions lapped upon the inner faces of the rear portions of the front sections, and a rear section engaged with the end and sides of the rear end of the central section and having rearward extensions lapped upon the inner faces of the rear portions of the front sections, substantially as and for the purpose specified.

15. In a wheeled scraper, the combination of supporting-wheels, an axle connecting the wheels, a tray having an engaging shoulder, a lever supported on the axle and having its front end connected to the tray for supporting said tray and its rear end provided with a plurality of shoulders arranged one above the other for detachably engaging the shoulder of the tray, and a draft member connected to the tray, substantially as and for the purpose set forth.

In testimony whereof we have hereunto signed our names, in the presence of two attesting witnesses, at Syracuse, in the county of Onondaga, in the State of New York, this 15th day of January, 1901.

HERBERT N. BAKER.
    GEORGE N. BAKER.

Witnesses:
 S. Davis,
 D. Lavine.